US011034320B2

(12) United States Patent
Minakawa

(10) Patent No.: US 11,034,320 B2
(45) Date of Patent: Jun. 15, 2021

(54) OCCUPANT RESTRAINT STRUCTURE

(71) Applicant: HONDA MOTOR CO., LTD., Tokyo (JP)

(72) Inventor: Yasuhiro Minakawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 8 days.

(21) Appl. No.: 16/488,247

(22) PCT Filed: Mar. 22, 2017

(86) PCT No.: PCT/JP2017/011381
§ 371 (c)(1),
(2) Date: Aug. 23, 2019

(87) PCT Pub. No.: WO2018/173138
PCT Pub. Date: Sep. 27, 2018

(65) Prior Publication Data
US 2020/0010041 A1 Jan. 9, 2020

(51) Int. Cl.
B60R 21/205 (2011.01)
B62D 1/183 (2006.01)
B62D 1/06 (2006.01)
B60R 21/231 (2011.01)

(52) U.S. Cl.
CPC .......... B60R 21/205 (2013.01); B60R 21/231 (2013.01); B62D 1/06 (2013.01); B62D 1/183 (2013.01); B60R 2021/23161 (2013.01)

(58) Field of Classification Search
CPC ................ B60R 21/205; B60R 21/231; B60R 2021/23161; B62D 1/183; B62D 1/185

USPC .................................................. 280/732, 775
See application file for complete search history.

(56) References Cited

U.S. PATENT DOCUMENTS

2014/0260761 A1 9/2014 Soderlind
2015/0137492 A1 5/2015 Rao et al.

FOREIGN PATENT DOCUMENTS

| JP | 07-025305 | | 1/1995 |
| JP | 07-025306 | | 1/1995 |
| JP | 09-011837 | | 1/1997 |
| JP | 2005-225279 | | 8/2005 |
| JP | 2005-225279 A | * | 8/2005 |

(Continued)

OTHER PUBLICATIONS

International Search Report and Written Opinion for International Application Serial No. PCT/JP2017/011381 dated Jun. 6, 2017, 11 pages.

(Continued)

Primary Examiner — Keith J Frisby
(74) Attorney, Agent, or Firm — Amin, Turocy & Watson, LLP

(57) ABSTRACT

An occupant restraint structure (5) includes a steering wheel (300) provided with a grip section (310), an instrument panel (500) having a panel (510) on the side of a driver's seat, and an airbag (410). The grip section (310) has an acyclic shape. The airbag (410) is deployed behind a rear end reference surface (S) that is an end surface of the panel (510) on the side of the driver's seat on a rear side of the vehicle. At least a part of the grip section (310) is disposed further forward with respect to the vehicle than the rear end reference surface (S) of the panel (510) on the side of the driver's seat.

3 Claims, 5 Drawing Sheets

(56) References Cited

FOREIGN PATENT DOCUMENTS

| | | |
|---|---|---|
| JP | 2006-298119 | 11/2006 |
| JP | 2007-131056 | 5/2007 |
| JP | 2007-145146 | 6/2007 |
| JP | 2007-145146 A * | 6/2007 |
| JP | 2011-037398 | 2/2011 |

OTHER PUBLICATIONS

Japanese Notice of Allowance for Japanese Patent Application No. 2019-506783 dated Jun. 23, 2020.

* cited by examiner

OCCUPANT RESTRAINT STRUCTURE

TECHNICAL FIELD

The present invention relates to an occupant restraint structure.

BACKGROUND ART

Upon a collision of a vehicle, an airbag is deployed to restrain an occupant. An airbag for a driver's seat is accommodated in an airbag module disposed in a central section of a steering wheel. When acceleration upon a collision is detected, the airbag is deployed from the airbag module. The steering wheel is present further forward in the vehicle with respect to the deployed airbag. A force applied to the airbag from the occupant is supported by the steering wheel. Since the steering wheel has an annular shape, the airbag is uniformly supported by the steering wheel.

A steering apparatus in the related art mechanically changes a turning angle of tires according to a rotation amount of the steering wheel. On the other hand, in recent years, a steer-by-wire technology has been developed. A steering apparatus in the steer-by-wire technology electrically changes a turning angle of tires according to a rotation amount of a steering wheel. That is, the rotation amount of the steering wheel is converted into an electrical signal, and the electrical signal is transmitted to a control part. The control part drives a motor or the like and changes a turning angle of tires according to the electrical signal.

CITATION LIST

Patent Literature

[Patent Document 1]
  Japanese Unexamined Patent Application, First Publication No. 2011-37398
[Patent Document 2]
  Japanese Unexamined Patent Application, First Publication No. 2007-131056
[Patent Document 3]
  Japanese Unexamined Patent Application, First Publication No. H07-25306
[Patent Document 4]
  Japanese Unexamined Patent Application, First Publication No. H07-25305
[Patent Document 5]
  Japanese Unexamined Patent Application, First Publication No. 2006-298119

SUMMARY OF INVENTION

Technical Problem

In the steer-by-wire technology, there is no need to rotate the steering wheel by a large angle (for example, 360 degrees or more). For this reason, a grip section of the steering wheel does not need to have an annular shape. When the grip section of the steering wheel is divided in an acyclic shape, the steering wheel is present in front of only a part of the deployed airbag. For this reason, only a part of the deployed airbag is supported by the steering wheel. In this case, it is desired to more uniformly support the deployed airbag. According to this, it is desired to more uniformly restrain an occupant using the airbag.

Here, the present invention is directed to provide an occupant restraint structure capable of more uniformly supporting a deployed airbag.

Solution to Problem

In order to achieve the aforementioned objects, an occupant restraint structure of the present invention employs the following aspects.

(1) An occupant restraint structure of the present invention (for example, an occupant restraint structure (5) in an embodiment) includes a steering apparatus (for example, a steering wheel (300) in the embodiment) provided with a grip section (for example, a grip section (310) in the embodiment), an instrument panel (for example, a panel (510) on the side of a driver's seat in the embodiment), and an airbag (for example, an airbag (410) in the embodiment), wherein the grip section has an acyclic shape, the airbag is deployed behind a rear end reference surface (for example, a rear end reference surface S in the embodiment) that is a virtual plane in contact with the instrument panel from behind in an upward direction and both of leftward and rightward directions of the grip section, and at least a part of the grip section is disposed further forward with respect to the vehicle than the rear end reference surface.

According to the configuration, at least a part of the grip section is disposed further forward with respect to the vehicle than the rear end reference surface of the instrument panel. For this reason, the deployed airbag is also supported by the instrument panel in addition to the grip section of the steering apparatus. Accordingly, the deployed airbag can be more uniformly supported. In addition, the deployed airbag is supported by the instrument panel disposed in the upward direction and both of the leftward and rightward directions of the grip section in addition to the grip section of the steering apparatus. Accordingly, the deployed airbag can be more uniformly supported.

(3) In the occupant restraint structure according to the above-mentioned (1), at least a front end portion of an upper end portion of the grip section may be disposed in front of the rear end reference surface.

According to the configuration, when the airbag is deployed from above the steering apparatus, an amount of contact of the airbag with the upper end portion of the grip section can be reduced. Accordingly, the airbag can be smoothly deployed.

(4) In the occupant restraint structure according to any one of above-mentioned (1) to (3), the grip section may be able to adjust a position in a forward/rearward direction, and at least a part of the grip section may be disposed in front of the rear end reference surface even when the grip section is disposed at the rearmost position.

According to the configuration, even when the grip section is disposed at the rearmost position, an amount of the airbag supported by the grip section can be reduced by supporting the deployed airbag using the instrument panel. Accordingly, the deployed airbag can be more uniformly supported.

(5) In the occupant restraint structure according to any one of the above-mentioned (1) to (4), the steering apparatus may include a pair of grip sections divided and disposed in the leftward/rightward direction of the vehicle, and a connecting section configured to connect lower sections of the pair of grip sections to each other.

According to the configuration, the upper, left and right sections of the deployed airbag are supported by the instrument panel, and simultaneously, the lower section of the deployed airbag is supported by the connecting section of the steering apparatus. Accordingly, the deployed airbag can be uniformly supported.

(6) In the occupant restraint structure according to any one of the above-mentioned (1) to (5), the airbag may be deployed to cross a driver's seat and a passenger's seat.

According to the configuration, there is no need to separately provide airbags for the driver's seat and the passenger's seat. Accordingly, costs of the occupant restraint structure can be reduced.

Advantageous Effects of Invention

According to the present invention, even when a grip section of a steering apparatus has an acyclic shape, a deployed airbag can be more uniformly supported.

DESCRIPTION OF EMBODIMENTS

Hereinafter, embodiments of an occupant restraint structure of the present invention will be described with reference to the accompanying drawings.

The occupant restraint structure of the present invention is effective when a steering wheel has an acyclic shape. In many cases, the acyclic steering wheel is employed in a steer-by-wire technology. In many cases, the steer-by-wire technology is employed in an automatic driving vehicle. Here, a vehicle control system of the automatic driving vehicle will be described.

Figure 1:
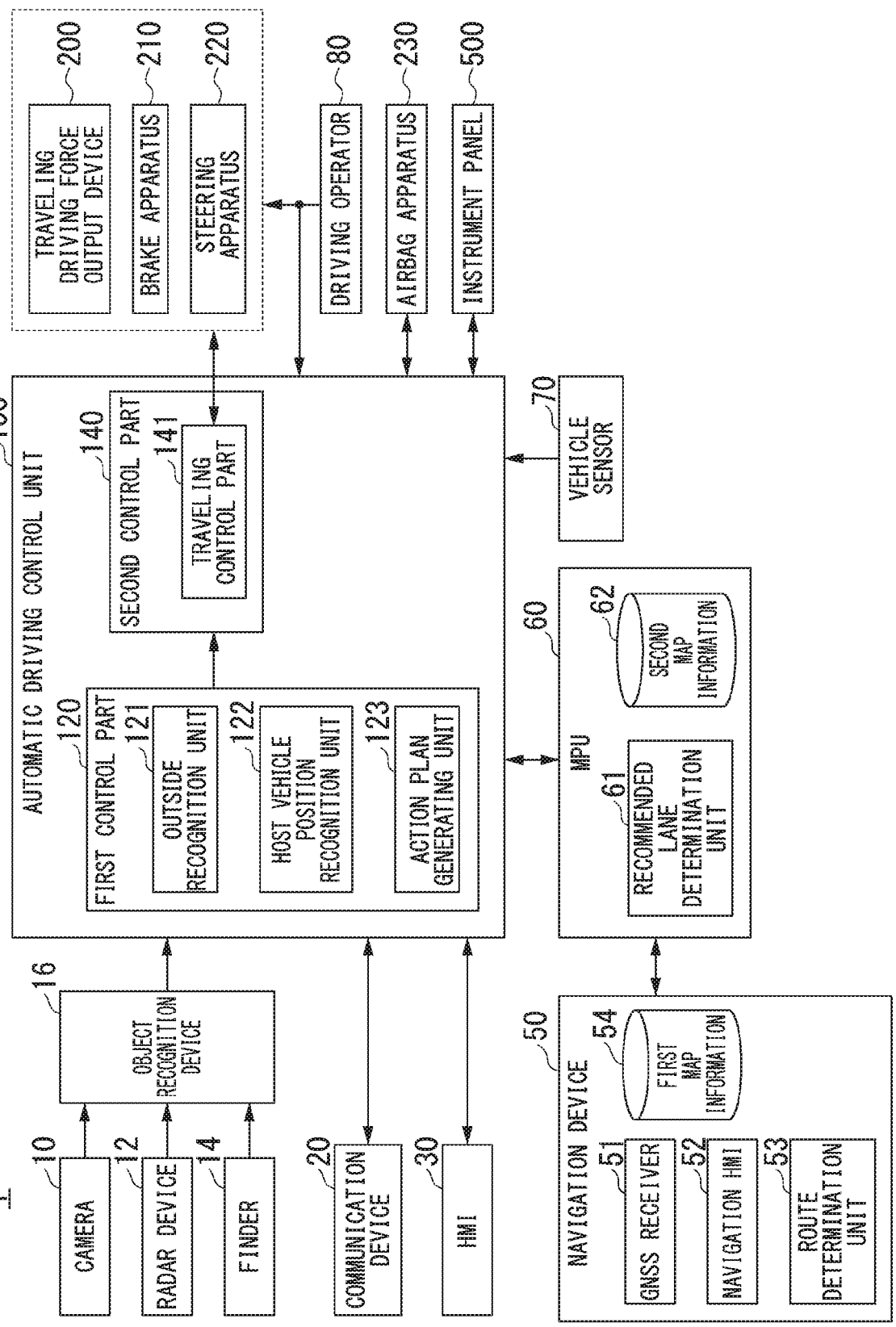
FIG. 1 is a configuration view of a vehicle control system 1.

FIG. 1 is a configuration view of a vehicle control system 1. A vehicle on which the vehicle control system 1 is mounted is, for example, a two-wheeled, three-wheeled or four-wheeled vehicle, or the like, and a driving source thereof is an internal combustion engine such as a diesel engine, a gasoline engine, or the like, an electric motor, or a combination thereof. The electric motor is operated using the generated output from a generator connected to the internal combustion engine or the discharged output of a secondary battery or a fuel cell.

The vehicle control system 1 includes, for example, a camera 10, a radar device 12, a finder 14, an object recognition device 16, a communication device 20, a human machine interface (HMI) 30, a navigation device 50, a micro-processing unit (MPU) 60, a vehicle sensor 70, an automatic driving control unit 100, a traveling driving force output device 200, a brake apparatus 210 and a steering apparatus 220. These apparatuses or instruments are connected to each other by a multiple communication line such as a controller area network (CAN) communication line or the like, a serial communication line, a wireless communication network, or the like. Further, the configuration shown in FIG. 1 is merely an example, and a part of the configuration may be omitted or other constituents may be added thereto.

The camera 10 is a digital camera utilizing a solid-state image sensing device, for example, a charge coupled device (CCD), a complementary metal oxide semiconductor (CMOS), or the like. One or a plurality of cameras 10 are attached to arbitrary places on a vehicle (hereinafter, referred to as a host vehicle M) on which the vehicle control system 1 is mounted. When a side in front of the vehicle is imaged, the camera 10 is attached to an upper section of a front windshield, a back surface of a rearview mirror, or the like. The camera 10 images the surroundings of the host vehicle M, for example, periodically and repeatedly. The camera 10 may be a stereo camera.

The radar device 12 detects at least a position (a distance to and an azimuth) of an object by radiating radio waves such as millimeter waves or the like to the surroundings of the host vehicle M and detecting the radio wave (a reflected wave) reflected by the object. One or a plurality of radar devices 12 are attached to the host vehicle M at arbitrary places. The radar device 12 may detect a position and a speed of an object using a frequency modulated continuous wave (FM-CW) method.

The finder 14 is a light detection and ranging or laser imaging detection and ranging (LIDAR) device configured to measure scattered light with respect to irradiation light and detect a distance to an object. One or a plurality of finders 14 are attached to the host vehicle M at arbitrary places.

The object recognition device 16 performs sensor fusion processing with respect to detection results using some or all of the camera 10, the radar device 12 and the finder 14, and recognizes a position, a type, a speed, or the like, of the object. The object recognition device 16 outputs a recognition result to the automatic driving control unit 100.

The communication device 20 communicates with other vehicles (an example of surrounding vehicles) present around the host vehicle M or communicates with various server devices via a radio base station using, for example, a cellular network, a Wi-Fi network, Bluetooth (registered trademark), dedicated short range communication (DSRC), or the like.

The HMI 30 presents various types of information to an occupant in the host vehicle M and receives an input operation of the occupant. The HMI 30 includes various types of display device, a speaker, a buzzer, a touch panel, a switch, a key, or the like.

The navigation device 50 includes, for example, a global navigation satellite system (GNSS) receiver 51, a navigation HMI 52 and a route determination unit 53, and first map information 54 is held on a storage device such as a hard disk drive (HDD), a flash memory, or the like. The GNSS receiver 51 specifies a position of the host vehicle M on the basis of a signal received from a GNSS satellite. The position of the host vehicle M may be specified or complemented by an inertial navigation system (INS) using an output of the vehicle sensor 70. The navigation HMI 52 includes a display device, a speaker, a touch panel, a key, and the like. The navigation HMI 52 may be shared with a part or all of the above-mentioned HMI 30. The route determination unit 53 determines a route to a destination input by an occupant from a position of the host vehicle M specified by the GNSS receiver 51 (or an arbitrary position that is input) using, for example, the navigation HMI 52, with reference to the first map information 54. The first map information 54 is, for example, information in which a road form is expressed by a link showing a road and nodes connected by the link. The first map information 54 may include a curvature of a road, point of interest (POI) information, or the like. The route determined by the route determination unit 53 is output to the MPU 60. In addition, the navigation device 50 may perform guidance for the route using the navigation HMI 52 on the basis of the route determined by the route determination unit 53. Further, the navigation device 50 may be realized by, for example, a function of a terminal device such as a smartphone, a tablet terminal, or the like, carried by the occupant. In addition, the navigation device 50 may transmit the current position and a destination to a navigation server via the communication device 20 and acquire a route returned from the navigation server.

The MPU 60 functions as, for example, a recommended lane determination unit 61, and holds second map information 62 in a storage device such as an HDD, a flash memory, or the like. The recommended lane determination unit 61 divides the route provided from the navigation device 50 into a plurality of blocks (for example, divides the route every 100 [m] in a direction of advance of the vehicle), and determines a recommended lane at every block with reference to the second map information 62. The recommended lane determination unit 61 performs determination of which numbered lane from the left the vehicle will travel in. The recommended lane determination unit 61 determines a recommended lane such that the host vehicle M can travel on a reasonable route to advance to a branch destination when a diverging point, a merging point, or the like, is present in the route.

The second map information 62 is map information that is more accurate than the first map information 54. The second map information 62 includes, for example, information on a center of the lane, information of a boundary of the lane, or the like. In addition, the second map information 62 includes road information, traffic regulations information, address information (address/zip code), facility information, telephone number information, and the like. The road information includes information that expresses types of road such as an expressway, a toll way, a national road and a prefectural road, or information such as the number of lanes of a road, a width of each lane, a slope of a road, a position (3-dimensional coordinates including a longitude, a latitude and a height) of a road, a curvature of a curve of a lane, positions of merging and diverging points of a lane, signs provided on roads, and the like. The second map information 62 may be updated at any time by accessing another apparatus using the communication device 20.

The vehicle sensor 70 includes a vehicle speed sensor configured to detect a speed of the host vehicle M, an acceleration sensor configured to detect an acceleration, a yaw rate sensor configured to detect an angular speed around a vertical axis, an azimuth sensor configured to detect an orientation of the host vehicle M, and the like. In addition, the vehicle sensor 70 has a steering angle detection unit configured to detect a steering angle of the host vehicle M. The steering angle detection unit detects a steering angle of the host vehicle M by detecting, for example, a variation in position, rotation, or the like, of a rack and pinion mechanism included in the steering apparatus 220. The vehicle sensor 70 outputs the detected information (a speed, an acceleration, an angular speed, an azimuth, and the like) to the automatic driving control unit 100.

The automatic driving control unit (the automatic driving control part) 100 includes, for example, a first control part 120 and a second control part 140. Each of the first control part 120 and the second control part 140 is realized when a processor such as a central processing unit (CPU) or the like executes a program (software). In addition, some or all of function parts of the first control part 120 and the second control part 140, which will be described below, may be realized by hardware such as a large scale integration (LSI), an application specific integrated circuit (ASIC), a field-programmable gate array (FPGA), or the like, or may be realized by cooperation of software and hardware.

The first control part 120 includes, for example, an outside recognition unit 121, a host vehicle position recognition unit 122 and an action plan generating unit 123.

The outside recognition unit 121 recognizes a position, a speed, an acceleration, and the like, of a surrounding vehicle on the basis of information input directly from the camera 10, the radar device 12 and the finder 14 or via the object recognition device 16. The position of the surrounding vehicle may be expressed by a representative point such as a center of gravity, corners, or the like, of the surrounding vehicle, or may be expressed by an area represented with a contour of the surrounding vehicle. The "state" of the surrounding vehicle may include an acceleration or a jerk of the surrounding vehicle, or "an action state" (for example, whether the vehicle is performing lane change or will attempt to perform lane change). In addition, the outside recognition unit 121 may recognize positions of a guard rail, an electricity pole, a parked vehicle, a pedestrian, and other objects, in addition to the surrounding vehicle.

The host vehicle position recognition unit 122 recognizes, for example, a lane in which the host vehicle M is traveling (a traveling lane), and a relative position and an attitude of the host vehicle M with respect to the traveling lane. The host vehicle position recognition unit 122 recognizes the traveling lane by comparing, for example, a pattern of road lane markings obtained from the second map information 62 (for example, an arrangement of solid lines and broken lines) with a pattern of a road lane markings around the host vehicle M recognized in an image captured by the camera 10. In the recognition, the position of the host vehicle M acquired from the navigation device 50 or processing results by the INS may be applied.

The action plan generating unit 123 determines events sequentially executed in automatic driving in order to travel in the recommended lane determined by the recommended lane determination unit 61 and deal with the surrounding situation with respect to the host vehicle M. The events may be, for example, a constant speed traveling event in which the host vehicle M travels along the same traveling lane at a constant speed, a following traveling event in which the host vehicle M follows a preceding vehicle, a lane change event, a merging event, a diverging event, an emergency stopping event, a handover event of terminating automatic driving and switching automatic driving to manual driving, and the like. In addition, during execution of these events, an action for avoidance may be planned on the basis of the surrounding situation of the host vehicle M (existence of a surrounding vehicle or a pedestrian, lane constriction due to roadwork, and the like).

The action plan generating unit 123 generates a target trajectory along which the host vehicle M will travel in the future. The target trajectory includes, for example, a speed element. For example, the target trajectory is generated by setting a plurality of standard times in the future for each of predetermined sampling times (for example, about every several tenths of a [sec]) as a set of target points (trajectory points) reached at these standard times. For this reason, when an interval between trajectory points is large, this shows that the host vehicle M is traveling along a section between the trajectory points at a high speed.

The second control part 140 includes a traveling control part 141. The traveling control part 141 controls the traveling driving force output device 200, the brake apparatus 210 and the steering apparatus 220 such that the host vehicle M passes along the target trajectory generated by the action plan generating unit 123 as scheduled.

According to the above-mentioned configuration, the automatic driving control unit 100 realizes automatic driving in which at least one of speed control and steering control of the host vehicle M is automatically performed. For example, the automatic driving control unit 100 may implement an automatic driving mode of automatically performing both of the speed control and the steering control of the host vehicle M. This mode is an automatic driving mode in which every vehicle control such as complicated merging control or the like is automatically performed, and an automatic driving mode in which there is no obligation for the driver to hold the steering wheel by hand (hereinafter, referred to as "an automatic driving mode with no necessity of gripping). The automatic driving control unit 100 outputs information showing a driving mode of the host vehicle M at least at this time to an instrument panel 500.

The traveling driving force output device 200 outputs a traveling driving force (torque) for making the vehicle to travel to the driving wheels. The traveling driving force output device 200 includes, for example, a combination of an internal combustion engine, an electric motor, a transmission, and the like, and an ECU configured to control them. The ECU controls the above-mentioned constituents according to the information input from the traveling control part 141 or information input from a driving operator 80.

The brake apparatus 210 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the traveling control part 141 or the information input from the driving operator 80, and causes a brake torque according to a braking operation to be output to the wheels. The brake apparatus 210 may include a mechanism configured to transmit a hydraulic pressure generated according to an operation of the brake pedal included in an operating device OD for a vehicle to the cylinder via the master cylinder as a backup. Further, the brake apparatus 210 is not limited to the above-mentioned configuration, and may be an electronic control type hydraulic pressure brake apparatus configured to control an actuator according to information input from the traveling control part 141 and transmit a hydraulic pressure of a master cylinder to a cylinder.

A so-called steer-by-wire technology is employed in the steering apparatus 220. The steering apparatus 220 includes, for example, a steering wheel, a rotation amount sensor, a steering ECU, a wire harness, an electric motor and a gearbox. The rotation amount sensor detects a rotation amount of the steering wheel. The steering ECU outputs a steering signal according to the detected rotation amount of the steering wheel or the information input from the traveling control part 141. The wire harness connects the steering ECU to the electric motor, and transmits the steering signal to the electric motor. The electric motor drives the gearbox including a rack and pinion mechanism or the like according to the steering signal. The gearbox changes an orientation of a steered wheel of the vehicle.

First Embodiment

An occupant restraint structure of a first embodiment will be described. In the application, directions of forward, rearward, upward, downward, rightward (when the vehicle is directed forward) and leftward (when the vehicle is directed forward) may be simply referred to as front, rear, upper, lower, right and left. In the drawings, front is represented as FR, rear is represented as RR, upper is represented as UPR, lower is represented as LWR, right is represented as RH, and left is represented as LH.

Figure 2:
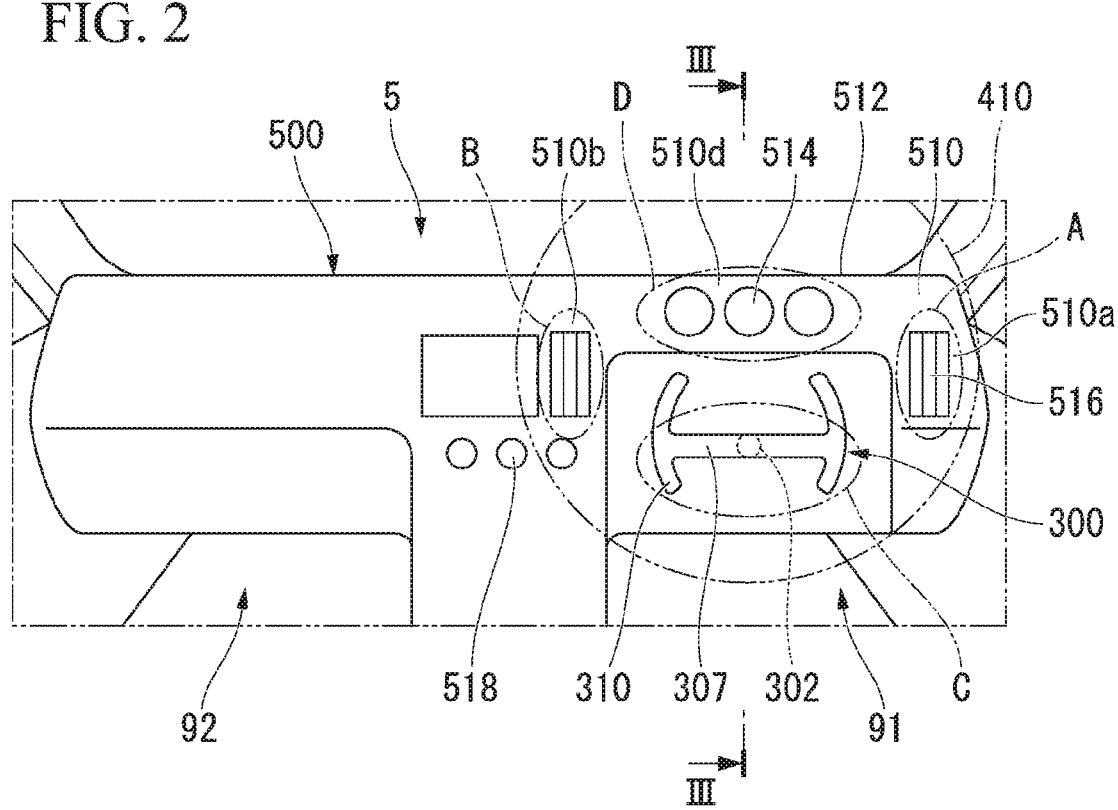
FIG. 2 is a front view of an occupant restraint structure 5 of a first embodiment.
Figure 3:
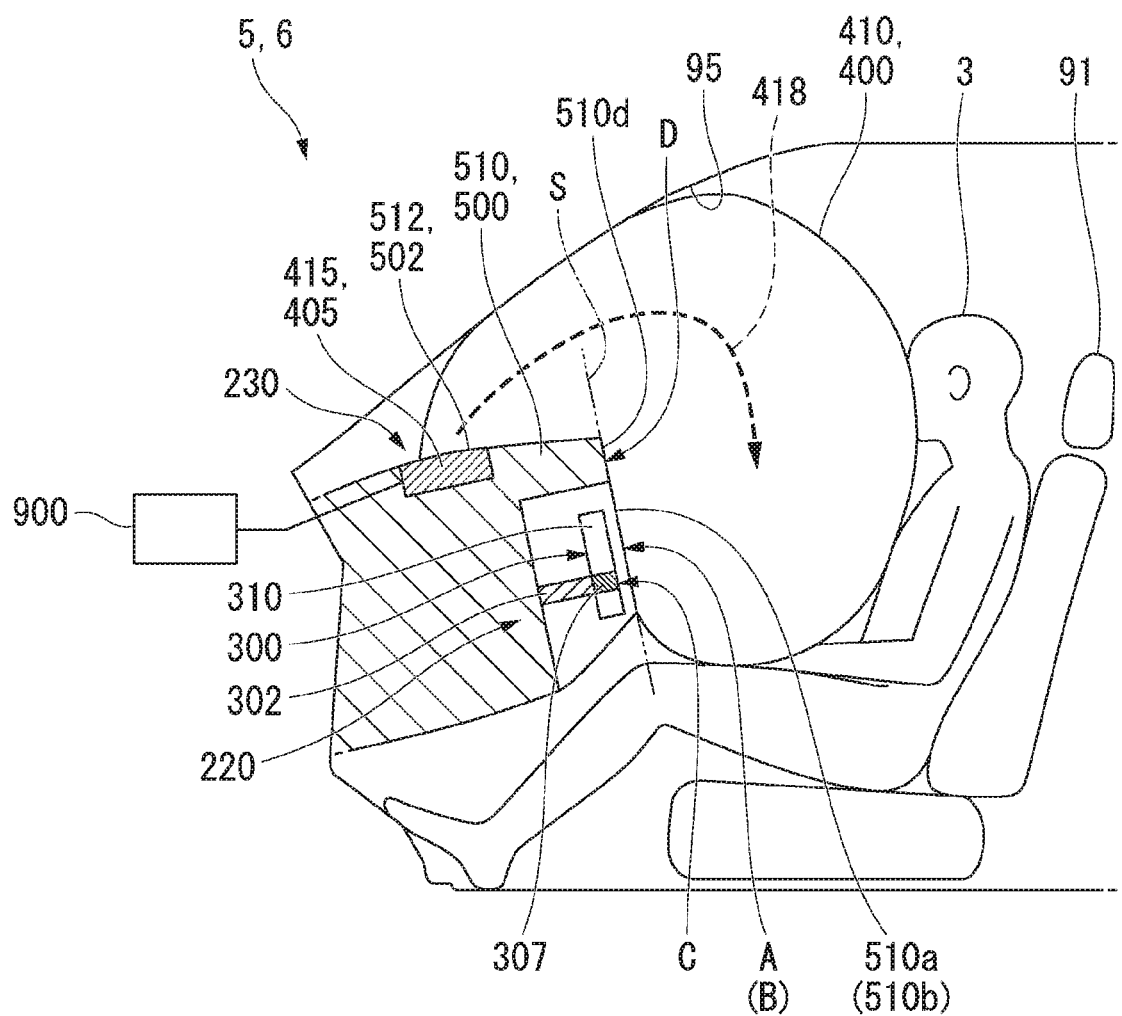
FIG. 3 is a cross-sectional view taken along line in FIG. 2.
Figure 3:
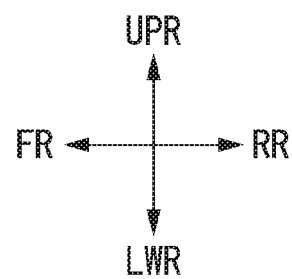

FIG. 2 is a front view of an occupant restraint structure 5 of the first embodiment. FIG. 3 is a cross-sectional view taken along line in FIG. 2. As shown in FIG. 3, the occupant restraint structure 5 includes a steering apparatus 220, an airbag apparatus 230, an instrument panel 500 and a collision control part 900. The steering apparatus 220 has a steering wheel 300.

As shown in FIG. 2, the steering wheel 300 has a pair of grip sections 310, a connecting section 307 and a shaft 302.

The grip sections 310 have an acyclic shape. The grip sections 310 are formed in a rod shape extending in a substantially upward/downward direction. The pair of grip sections 310 are disposed to be separated from each other in the leftward/rightward direction with the shaft 302 sandwiched therebetween. Each of the grip sections 310 is formed in an arc shape using the shaft 302 side as a concave section when seen from a rear side. The pair of grip sections 310 are gripped by left and right hands of a driver in the vehicle.

The connecting section 307 connects lower sections of the pair of grip sections 310. The connecting section 307 extends linearly in the leftward/rightward direction. The pair of grip sections 310 and the connecting section 307 are disposed in substantially an H shape when seen from a rear side.

The shaft 302 is disposed between the pair of grip sections 310. As shown in FIG. 3, the shaft 302 extends in the substantially forward/rearward direction. A central axis of the shaft 302 coincides with a rotary axis of the steering wheel 300. A rear end portion of the shaft 302 is connected to the connecting section 307. A front end portion of the shaft 302 is rotatably supported in a panel 510 on the side of the driver's seat of the instrument panel 500. The steering wheel 300 may have a forward/rearward position adjustment mechanism (a telescopic mechanism, not shown). During forward/rearward position adjustment of the steering wheel 300, the shaft 302 enters and exits the panel 510 on the side of the driver's seat.

As shown in FIG. 3, the airbag apparatus 230 has an airbag module 415.

The airbag module 415 is installed in the panel 510 on the side of the driver's seat of the instrument panel 500. The airbag module 415 is disposed along an upper surface 512 of the panel 510 on the side of the driver's seat. The airbag module 415 has an airbag 410 and an inflator (not shown). The inflator introduces a gas into the airbag 410 and deploys the airbag 410.

The airbag 410 is formed in a bag shape. The airbag 410 is stored inside the airbag module 415 in a folded state. The airbag 410 is deployed upward from the airbag module 415 by breaking the upper surface 512 of the panel 510 on the side of the driver's seat. The airbag 410 is deployed between the panel 510 on the side of the driver's seat and a front glass 95. Further, the airbag 410 is deployed between the panel 510 on the side of the driver's seat and a driver's seat 91.

The collision control part 900 controls an operation of the airbag apparatus 230. The collision control part 900 determines a collision of the vehicle on the basis of the information detected by the vehicle sensor 70 (See FIG. 1). The collision control part 900 operates the inflator and deploys the airbag 410 when the collision of the vehicle is determined.

As shown in FIG. 2, the instrument panel 500 is disposed at a front side in a passenger compartment. The instrument panel 500 has the panel 510 on the side of the driver's seat on the side of the driver's seat 91. The panel 510 on the side of the driver's seat has a display part 514, an air outlet 516 of an air-conditioning apparatus, various switches 518, and so on. In the automatic driving vehicle, information to be displayed to a driver and switches to be operated by the driver are limited. For this reason, in the automatic driving vehicle, a degree of freedom of a layout of the panel 510 on the side of the driver's seat is large.

The panel 510 on the side of the driver's seat protrudes rearward to cover the grip section 310 of the steering wheel 300 in the upward direction and both of leftward and rightward directions. An upper protrusion 510d of the panel 510 on the side of the driver's seat is disposed above the grip section 310. A right protrusion 510a of the panel 510 on the side of the driver's seat is disposed at the right side of the grip section 310. A left protrusion 510b of the panel 510 on the side of the driver's seat is disposed at the left side of the grip section 310. For example, the display part 514 is disposed on the upper protrusion 510d. For example, the outlet ports 516 of the air conditioning apparatus are disposed on the right protrusion 510a and the left protrusion 510b. The upper protrusion 510d, the right protrusion 510a and the left protrusion 510b are continuously formed.

A rear end reference surface S that is an end surface behind the panel 510 on the side of the driver's seat shown in FIG. 3 will be defined as follows. The rear end reference surface S is a virtual plane in contact with the panel 510 on the side of the driver's seat from behind in the upward direction and both of the leftward and rightward directions of the grip section 310. The panel 510 on the side of the driver's seat has three protrusions of the upper protrusion 510d, the right protrusion 510a and the left protrusion 510b. The virtual plane in contact with the three protrusions from the rear is unmistakably determined. Here, the virtual plane is the rear end reference surface S of the panel 510 on the side of the driver's seat. In the occupant restraint structure 5 of the embodiment shown in FIG. 3, rear end surfaces of the upper protrusion 510d, the right protrusion 510a and the left protrusion 510b are disposed on the same plane. In this case, the rear end surfaces of the upper protrusion 510d, the right protrusion 510a and the left protrusion 510b are included in the rear end reference surface S of the panel 510 on the side of the driver's seat.

As shown in FIG. 3, the airbag 410 is deployed behind the rear end reference surface S. At least a part of the grip section 310 is disposed in front of the rear end reference surface S. When the forward/rearward position adjustment mechanism of the steering wheel 300 is provided, even though the grip section 310 is disposed at the rearmost position, at least a part of the grip section 310 is disposed in front of the rear end reference surface S. In the occupant restraint structure 5 of the embodiment shown in FIG. 3, all of the pair of grip sections 310 and the connecting section 307 are disposed in front of the rear end reference surface S. Further, the rear end surfaces of the pair of grip sections 310 and the connecting section 307 substantially coincide with the rear end reference surface S.

An action of the occupant restraint structure 5 of the first embodiment will be described.

As shown in FIG. 3, upon the collision of the vehicle, the airbag 410 is deployed from the airbag module 415. The airbag 410 is deployed upward, rearward and downward along an arrow 418 in sequence, and disposed in front of a driver (an occupant) 3. Upon the collision of the vehicle, the driver 3 moves forward due to an inertial force. The driver 3 moved forward is restrained by the airbag 410. The front glass 95 is present in front of the airbag 410. Some of power applied to the airbag 410 from the driver 3 is supported by the front glass 95.

Incidentally, when the steering wheel 300 protrudes rearward from the panel 510 on the side of the driver's seat, the deployed airbag 410 is mainly supported by the steering wheel 300. However, the grip sections 310 of the steering wheel 300 are formed in an acyclic shape. For this reason, only a part of the deployed airbag is supported by the steering wheel 300. In this case, it is desired to more uniformly support the deployed airbag. According to this, it is desired to more uniformly restrain the occupant using the airbag.

On the other hand, at least a part of the grip section 310 is disposed further forward with respect to the vehicle than the rear end reference surface S of the panel 510 on the side of the driver's seat. In particular, in the embodiment, the pair of grip sections 310 are disposed in front of the rear end reference surface S as a whole. According to the configuration, the deployed airbag 410 is also supported by the panel 510 on the side of the driver's seat in addition to the grip section 310 of the steering wheel 300. That is, a ratio of the deployed airbag 410 supported by the acyclic grip section 310 is reduced. For this reason, the deployed airbag 410 can be more uniformly supported.

The grip section 310 can also adjust a position in the forward/rearward direction using the forward/rearward position adjustment mechanism. However, even when the grip section 310 is disposed at the rearmost position, at least a part of the grip section 310 is disposed in front of the rear end reference surface S. According to the configuration, even when the grip section 310 is disposed at the rearmost position, a level of the deployed airbag 410 supported by the grip section 310 can be reduced by supporting the deployed airbag 410 using the panel 510 on the side of the driver's seat. Accordingly, the deployed airbag 410 can be more uniformly supported.

Figure 4:
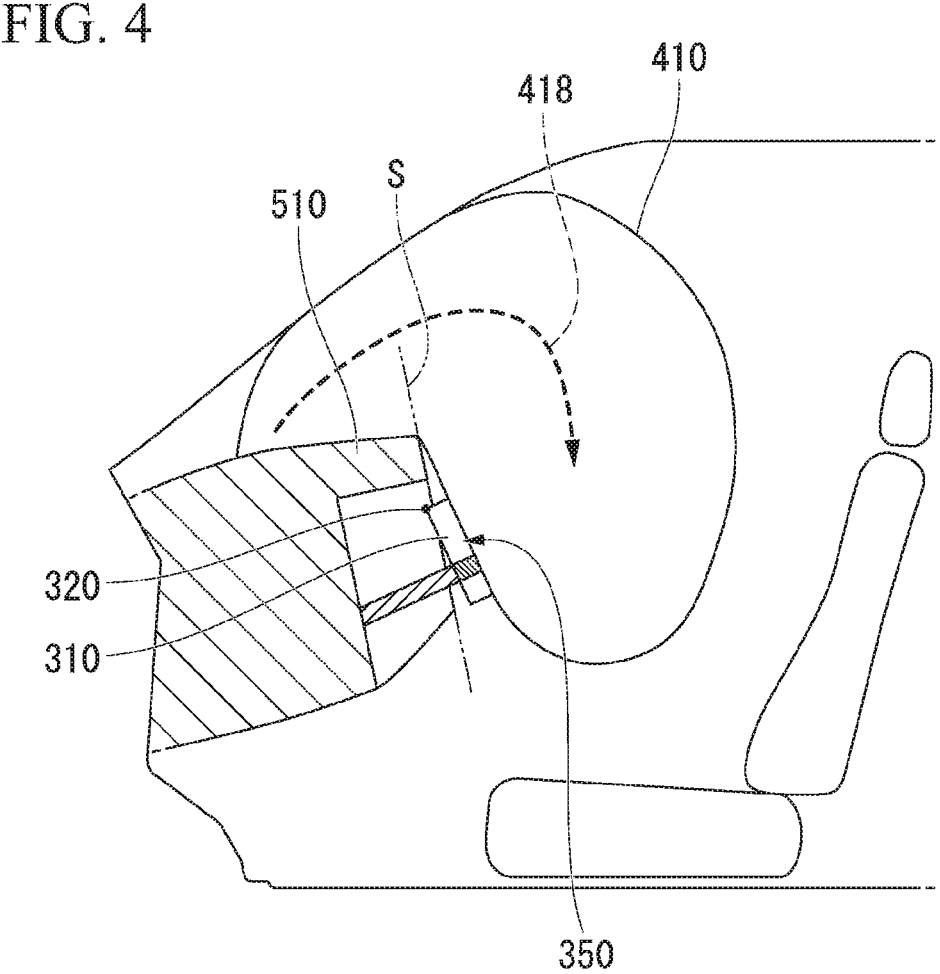
FIG. 4 is a cross-sectional view of a portion corresponding to line in FIG. 2, showing a variant of the steering wheel.
Figure 4:
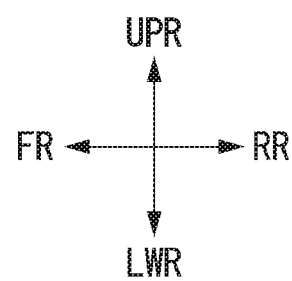

FIG. 4 is a cross-sectional view of a portion corresponding to line in FIG. 2, showing a variant of the steering wheel. As described above, the airbag 410 is deployed along an arrow 418 in sequence of upward, rearward and downward. Here, at least a front end portion (an upper front end portion) 320 of an upper end portion of the grip section 310 is desirably disposed further forward with respect to the vehicle than the rear end reference surface S of the panel 510 on the side of the driver's seat. According to the configuration, when the airbag 410 is deployed from an upper side of the steering wheel 300, a contact of the airbag 410 with the upper end portion of the grip section 310 can be reduced. Accordingly, the airbag 410 can be smoothly deployed.

As shown in FIG. 2, the rear end reference surface S of the panel 510 on the side of the driver's seat is a virtual plane in contact with the panel 510 on the side of the driver's seat from behind in the upward direction and both of the leftward and rightward directions of the grip section 310. That is, the rear end reference surface S is a virtual plane in contact with the upper protrusion 510d, the right protrusion 510a and the left protrusion 510b of the panel 510 on the side of the driver's seat from behind. The grip section 310 is disposed in front of the rear end reference surface S. For this reason, the deployed airbag 410 is supported by the upper protrusion 510d, the right protrusion 510a and the left protrusion 510b of the panel 510 on the side of the driver's seat in addition to the grip section 310 of the steering wheel 300. As shown in FIG. 2, a right section A of the airbag 410 is supported by the right protrusion 510a. A left section B of the airbag 410 is supported by the left protrusion 510b. An upper section D of the airbag 410 is supported by the upper protrusion 510d. Accordingly, the deployed airbag 410 can be more uniformly supported.

The steering wheel 300 includes the pair of grip sections 310 divided and disposed in the leftward/rightward direction of the vehicle, and the connecting section 307 configured to connect the lower sections of the pair of grip sections 310 to each other. According to the configuration, a lower section C of the deployed airbag 410 is supported by the connecting section 307 of the steering wheel 300. Accordingly, substantially the entire region of the deployed airbag 410 is supported by the panel 510 on the side of the driver's seat and the steering wheel 300. Accordingly, the deployed airbag 410 can be uniformly supported.

Second Embodiment

An occupant restraint apparatus of a second embodiment will be described.

Figure 5:
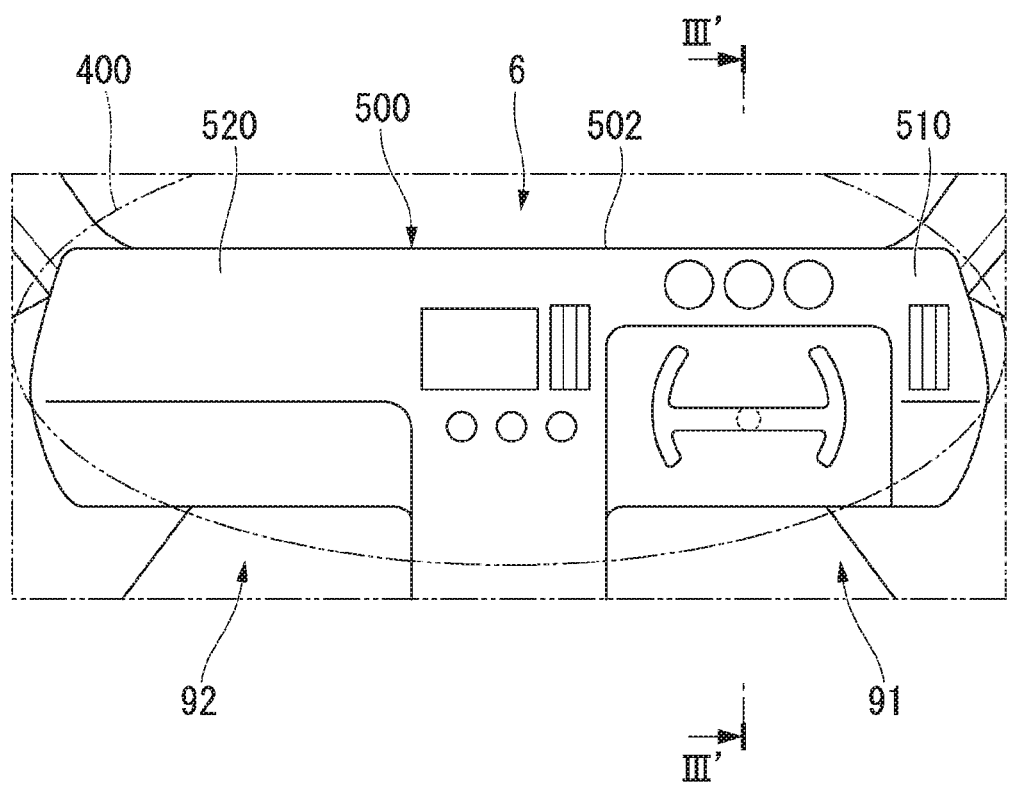
FIG. 5 is a front view of an occupant restraint structure 6 of a second embodiment.
Figure 5:
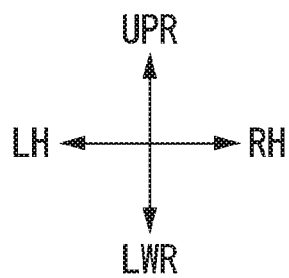

FIG. 5 is a front view of an occupant restraint structure 6 of the second embodiment. Further, a cross-sectional view taken along line III'-III' in FIG. 5 substantially coincides with that of FIG. 3. The occupant restraint structure 6 of the second embodiment is distinguished from the first embodiment in that an airbag 400 is deployed to cross a driver's seat and a passenger's seat. A detailed description of the same components as those of the first embodiment will be omitted.

As shown in FIG. 5, an instrument panel 500 has a panel 510 on the side of the driver's seat and a panel 520 on the side of the passenger's seat. A rear end surface of the panel 520 on the side of the passenger's seat is included in the rear end reference surface S (see FIG. 3) of the panel 510 on the side of the driver's seat. In addition, the entire rear end surface of the instrument panel 500 coincides with the rear end reference surface of the panel 510 on the side of the driver's seat.

As shown in FIG. 3, in the first embodiment, the airbag module 415 is disposed along the upper surface 512 of the panel 510 on the side of the driver's seat. In the second embodiment, an airbag module 405 is disposed along the upper surface 502 of the entire instrument panel 500 from the driver's seat 91 to the passenger's seat. Like the airbag 410 of the first embodiment, the airbag 400 of the second embodiment is deployed upward by breaking the upper surface 502 of the instrument panel 500. The airbag 400 is deployed between the instrument panel 500 and the front glass 95. Further, the airbag 400 is deployed between the instrument panel 500 and the driver's seat 91 and the passenger's seat.

As shown in FIG. 5, the airbag 400 is deployed from the driver's seat 91 to the passenger's seat 92 in the leftward/rightward direction in the passenger compartment as a whole. The deployed airbag 400 is supported by the front glass and the instrument panel 500. As described above, the entire rear end surface of the instrument panel 500 coincides with the rear end reference surface of the panel 510 on the side of the driver's seat. For this reason, substantially the entire region of the airbag 400 can be uniformly supported. Accordingly, a driver (an occupant) on the driver's seat 91 and a passenger (an occupant) on the passenger's seat 92 can be similarly restrained. Incidentally, when the vehicle is subjected to an offset collision, the driver and the passenger are moved forward obliquely. Since the airbag 400 of the second embodiment is deployed in the passenger compartment in the leftward/rightward direction as a whole, the driver and the passenger moved forward obliquely can also be restrained.

As described above in detail, in the occupant restraint structure 6 of the second embodiment, the airbag 400 is deployed to cross the driver's seat and the passenger's seat. According to the configuration, there is no need to separately provide airbags for the driver's seat 91 and the passenger's seat 92. Accordingly, the costs of the occupant restraint structure 6 can be reduced.

Further, the technical scope of the present invention is not limited to the above-mentioned embodiments, and various modifications may be added to the above-mentioned embodiments without departing from the spirit of the present invention. That is, the configurations of the above-mentioned embodiments are merely examples and may be appropriately modified.

In the embodiments, the connecting section 307 connects the lower end portions of the pair of grip sections 310 to each other. On the other hand, the connecting section 307 may connect other portions of the pair of grip sections 310 to each other. In addition, the connecting section 307 may be disposed in front of the pair of grip sections 310 and connect the pair of grip sections 310 to each other.

In the embodiment, the airbag 410 or 400 is deployed from the airbag module 415 or 405 disposed along the upper surface 502 of the instrument panel 500. On the other hand, the airbag may be deployed from the airbag module disposed on another portion of the instrument panel 500 or a place other than the instrument panel 500.

In the embodiments, the upper protrusion 510d, the right protrusion 510a and the left protrusion 510b are formed to be continuous with each other. On the other hand, the upper protrusion 510d, the right protrusion 510a and the left protrusion 510b may be formed to be separated from each other (discontinuous).

In the embodiments, the rear end surfaces of the upper protrusion 510d, the right protrusion 510a and the left protrusion 510b are disposed on the same plane. On the other hand, the rear end surfaces of the upper protrusion 510d, the right protrusion 510a and the left protrusion 510b may be disposed on different planes from each other.

REFERENCE SIGNS LIST

S Rear end reference surface
5, 6 Occupant restraint structure
91 Driver's seat
92 Passenger's seat
300, 350 Steering wheel (steering apparatus)
307 Connecting section
310 Grip section
320 Upper front end portion
410, 400 Airbag
415, 405 Airbag module
500 Instrument panel
510 Panel on the side of the driver's seat
510a Right protrusion
510b Left protrusion
510d Upper protrusion

What is claim is:

1. An occupant restraint structure comprising: a steering apparatus provided with a grip section, an instrument panel, and an airbag, wherein the steering apparatus comprises a pair of grip sections divided and disposed in the leftward/rightward direction of the vehicle, and a connecting section configured to connect lower sections of the pair of grip sections to each other, the grip section has an acyclic shape, the airbag is deployed behind a rear end reference surface that is a virtual plane in contact with the instrument panel from behind in an upward direction and both of leftward and rightward direction of the grip section, and at least a part of the grip section is disposed further forward with respect to the vehicle than the rear end reference surface, a front end portion of an upper end portion of the grip section is disposed in front of the rear end reference surface, and the connecting section is disposed behind the rear end reference surface.

2. The occupant restraint structure according to claim 1, wherein the grip section is able to adjust a position in a forward/rearward direction, and at least a part of the grip section is disposed in front of the rear end reference surface even when the grip section is disposed at the rearmost position.

3. The occupant restraint structure according to claim 1, wherein the airbag is deployed to cross a driver's seat and a passenger's seat.

* * * * *